United States Patent [19]
Adler et al.

[11] 3,848,773
[45] Nov. 19, 1974

[54] RADIOACTIVE GAS DISPENSING DEVICE

[75] Inventors: Norman Adler, Arlington; John L. Morgenthau, Jr., Auburndale; Paul A. Gold, West Medford, all of Mass.

[73] Assignee: New England Nuclear Corp., Boston, Mass.

[22] Filed: Mar. 7, 1972

[21] Appl. No.: 232,576

[52] U.S. Cl............ 222/1, 222/5, 222/325, 222/373, 128/203
[51] Int. Cl............. B67b 7/24
[58] Field of Search ........... 222/3, 5, 325, 402.18, 222/82, 80, 319, 373, 395, 81, 85, 394, 160, 400.7, 193, 1, 129, 334; 128/184, 173 H, 216 G, 216 R, 2.08, 203, 185, 188, 234, 272

[56] References Cited
UNITED STATES PATENTS

| | | | |
|---|---|---|---|
| 3,470,874 | 10/1969 | Accetta | 222/325 X |
| 3,527,212 | 9/1970 | Clark | 128/173 H |
| 3,677,246 | 7/1972 | Stein | 128/216 |

*Primary Examiner*—Stanley H. Tollberg
*Assistant Examiner*—James M. Slattery
*Attorney, Agent, or Firm*—Dike, Bronstein, Roberts, Cushman & Pfund

[57] ABSTRACT

A device and method for dispensing a pre-measured amount of gas, such as a radioactive gas, contained in a sealed vial having a pierceable septum. A plurality of such vials are stored in an end-to-end relationship in a shielded tubular storage means. The dispensing device includes a dispenser portion having a pair of needles respectively connected to a gas dispensing adapter and displacement fluid intake adapter. One of the sealed vials is removed from the storage means and retained in a holder which is then inserted into the dispenser portion so that the septum of the vial is in a position opposite the ends of the needles. The vial is moved within the holder toward the needles so that the septum is pierced by the latter. Means are provided for injecting a displacement fluid, which in a particular embodiment may be air, into the vial through the fluid intake adapter and the needle connected thereto, thereby forcing the radioactive gas out from the vial through the other needle to the gas dispensing adapter for use in an appropriate instrument which, for example, may be a breathing apparatus, such as an oral syringe or a spirometer.

16 Claims, 13 Drawing Figures

RADIOACTIVE GAS DISPENSING DEVICE

This invention relates generally to gas-dispensing devices and, more particularly, to means for dispensing a premeasured amount of a gas, such as a radioactive gas, contained in a sealed vial having a pierceable septum.

It is desirable in certain medical treatments, for example, to be able to dispense a pre-measured dose of a gas, such as a radioactive gas, for injection into an organism. In such cases the gas may be dispensed into a breathing apparatus, such as an oral syringe or a spirometer. In these applications, the gas is usually required to be injected in relatively small and accurately measured quantities. Accordingly, the device which dispenses the gas should be arranged to permit an accurate dispensation of a pre-measured dose without appreciable loss, while at the same time, if the gas is a radioactive gas, it must be handled in such a manner that as little radioactive energy as possible is permitted to escape and cause harmful effects to those in the region of use. Further, the dispensing device should be relatively easy to use, in that it can be readily and safely loaded with a pre-measured dose of gas and the gas therein dispensed in a relatively simple manner with minimum danger from radioactivity.

This invention utilizes a gas-dispensing device in which a pre-measured amount of a gas is contained within a vial which may be made of glass, for example, with a cap at one end thereof, such cap having a pierceable septum. A plurality of such vials are stored in an appropriate storage unit, such as a tubular shaped case having a removable cap and, in the case of radioactive gas, fabricated from, or at least lined with, lead, for example, to prevent the escape of radioactive energy therefrom during storage and use. When the cap of a storage unit is removed, one of the stored vials is readily transferred from the storage unit to the dispensing device in a manner such that the danger of radioactive exposure is minimized.

The dispensing device comprises a dispenser portion and a vial holder portion which in a preferred embodiment can be inserted into the dispenser portion during use. The vial is transferred from the vial storage unit to the vial holder which is also appropriately lined with lead shielding material for attenuating the escape of radioactive energy from the gas during handling. The dispenser has a gas dispensing adapter and a displacement fluid intake adapter attached thereto. A pair of needles are appropriately mounted within the dispenser, one of the needles being connected to the gas dispensing adapter and the other being connected to the displacement fluid intake adapter. The latter adapter has attached thereto an appropriate means for injecting a displacement fluid into the dispenser for use in displacing the gas from the vial, as described in more detail below.

In use, the vial holder receives and retains the gas-filled vial so that when the vial holder is inserted into the interior of the dispenser, the pierceable septum of the vial is disposed substantially opposite the needles therein. A movable means, such as a plunger, is actuated to move the vial so that its septum is pierced by the needles and the needles are permitted to extend into the interior of the vial.

When the displacement fluid injection means is appropriately actuated, a sufficient amount of such fluid is forced into the vial through the fluid intake adapter and the needle to which it is connected so as to force out from the vial substantially all of the gas contained therein, such gas being forced out through the other needle to the gas dispensing adapter to which it is connected. The gas dispensing adapter is, in turn, attached to appropriate means for the desired use thereof. For example, it may be attached to a hypodermic needle which is fitted thereon and provides for injection of the gas into a breathing apparatus, such as an oral syringe or a spirometer. Alternatively, the gas may be dispensed into other vials, other types of syringes, or any other instruments that may require the use of pre-measured amounts of a gas.

Accordingly, a pre-measured amount of such gas is dispensed from the dispensing device with only a minimal amount of residual gas, if any, remaining in the vial after use. The vial holder can then be removed from the dispenser and the empty vial discarded.

Thus, a pre-measured dose of a radioactive gas can be obtained safely, accurately, and with relative ease in handling, the vials which contain such pre-measured doses also being capable of storage in a safe and easy-to-use manner. A more detailed description of a preferred embodiment of the invention is described below with the help of the accompanying drawings wherein FIG. 1 shows a side view of a particular embodiment of a gas-dispensing device of the invention;

Figure 1:
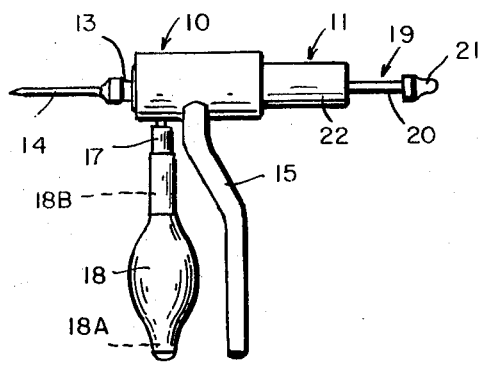
Figure 2:
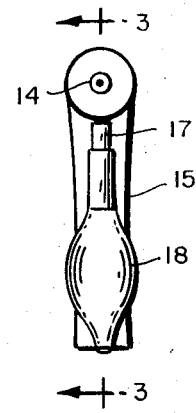
FIG. 2 shows an end view taken from the right-hand side of the gas-dispensing device of FIG. 1.

FIGS. 1 through 6 show one specific embodiment of the dispensing device of the invention which is used to dispense a pre-measured dose of a radioactive gas and, as can be seen therein, such device includes a first dispenser portion 10 and a second vial holder portion 11. Dispenser 10 in the preferred embodiment shown is of a substantially cylindrical construction and has at one end thereof a gas dispensing adapter 13 to which an appropriate hypodermic needle 14 can be suitably attached. A rigid handle member 15 extends outwardly from the side of dispenser 10 and is effectively shaped to provide a hand-gripping surface. The displacement fluid injection means is specifically depicted as injecting air and includes an air intake adapter 17 which is attached to the side of dispenser 10 and has secured thereto a flexible bulb 18 which extends outwardly from dispenser 10 adjacent rigid member 15. The flexible bulb is constructed so as to contain a first one-way valve (not shown) at the end 18A thereof to permit intake of air into the bulb and a second valve (not shown) located at a position 18B between the bulb and the air intake adapter 17 to permit air to enter the intake adapter when the bulb is collapsed and to prevent any reverse flow thereof back into the bulb. A movable plunger 19 having a shaft 20 and a head 21 is mounted within the cylindrical vial holder 11.

Figure 3:
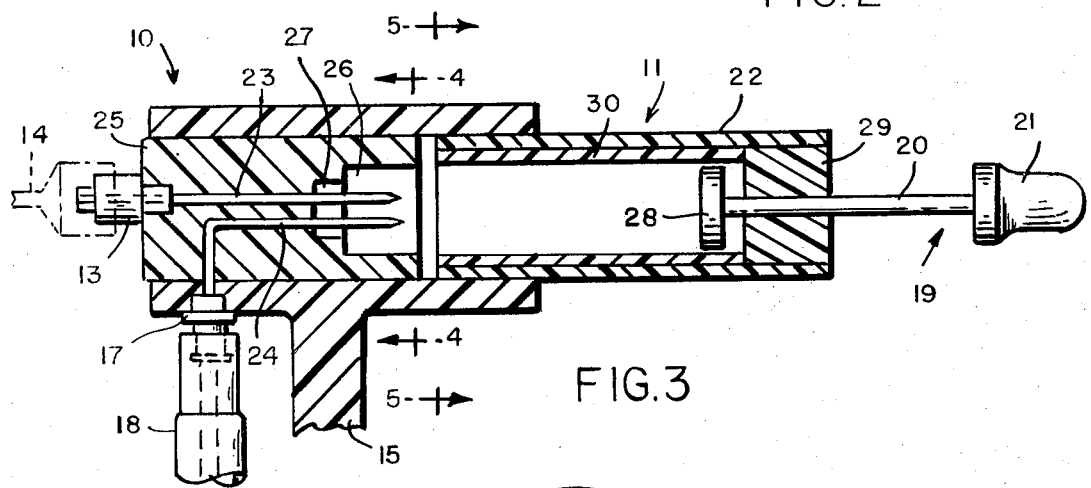
FIG. 3 shows a view in cross-section taken along the line 3—3 of FIG. 2.
Figure 4:
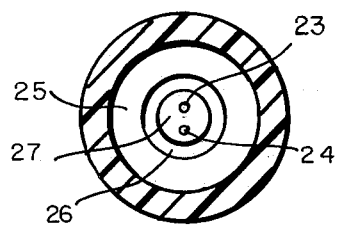
FIG. 4 is a view in cross-section taken along the line 4—4 of FIG. 4.
Figure 5:
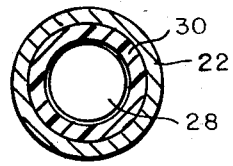
FIG. 5 is a view in cross-section taken along the line 5—5 of FIG. 3.

As can be seen best in FIG. 3, a first needle 23 is mounted within dispenser 10 and is connected to gas dispensing adapter 13. A second needle 24 is also mounted within dispenser 10, a portion of needle 24 being mounted adjacent needle 23 and in parallel relation thereto. Needle 24 is connected to air intake adapter 17 as shown. Needles 23 and 24 and gas dispensing adapter 13 are mounted, for example, in an insert 25, which may be of a suitable plastic, for example, and which in the embodiment shown has a recessed portion 26 into which the ends of needles 23 and 24 extend. A second recessed portion 27 extends inwardly of recessed portion 26 and has a reduced diameter in comparison to that of recess 26.

Plunger member 19 has an inner disc-shaped head 28 at one end of shaft 20, the latter being mounted in an insert 29, which may be made of a suitable plastic, for example, located at one end of vial holder 11. Accordingly, plunger 19 is adapted for reciprocal movement within vial holder 11, head 28 thereby moving within an inner liner 30 made of lead which functions as a radioactive shield. Liner 30 extends from the open end of vial holder 11 to plastic insert 29. Head 28 is also made of an appropriate shielding material such as lead. While the device shown uses a plunger extending from the end of the holder, other means for moving the vial within the holder may be used. For example, the externally moving portion thereof may be arranged to move within a slot fashioned in the side of vial holder 11.

Figure 6:
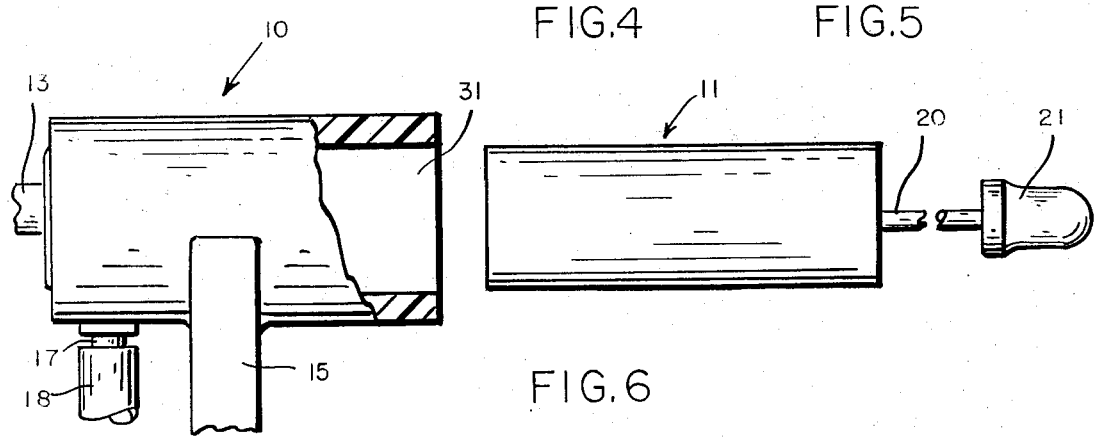
FIG. 6 shows an enlarged view partially in cross-section of a portion of the gas-dispensing device of FIG. 1.

As can be seen in FIG. 6, vial holder 11 is adapted to be movable into and out of the tubular opening 31 of dispenser portion 10. In order to permit easy insertion and removal of vial holder 11 into and out from the interior of dispenser 10, such members can be made of a material such as plexiglass or polystyrene. Vial holder 11 may be arranged to have an outer diameter which permits the holder to be retained relatively tightly within dispenser 10, as by a press fit, so that the holder cannot accidentally fall out of the dispenser during handling and use. Alternatively the holder 11 may be arranged to have a suitable locking member, such as a spring-loaded locking mechanism, for so retaining it in the dispenser 10.

Figure 7:
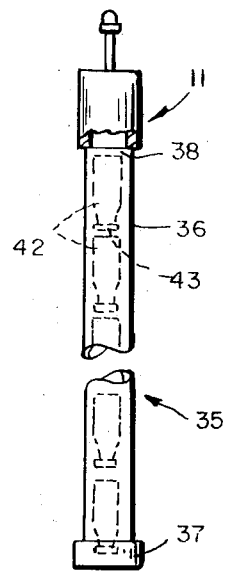
FIG. 7 shows a cut-away view of the vial storage device of the invention in a first position during use.
Figure 8:
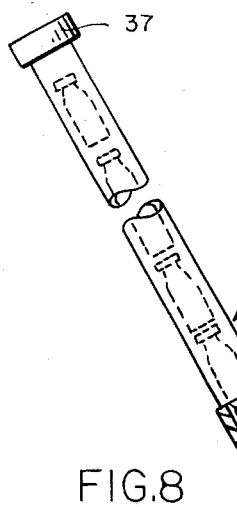
FIG. 8 shows another view of the vial source device of FIG. 7 in a second position during use.
Figure 9:
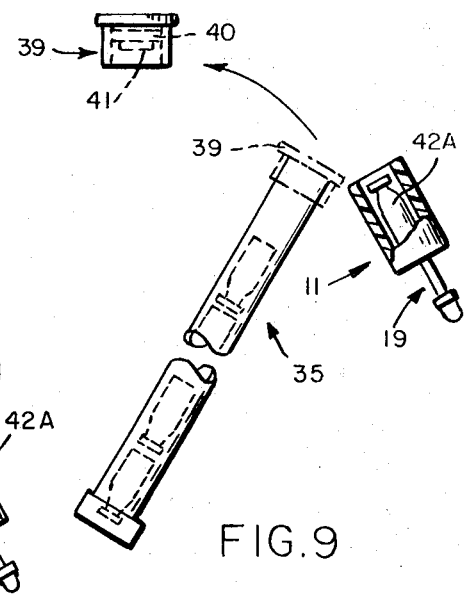
FIG. 9 shows still another view of the vial storage device of the invention of FIG. 7 in another position during use.

FIGS. 7 through 9 illustrate various positions of the vial storage member during use thereof in conjunction with the gas dispensing device of FIGS. 1 through 6. For example, in FIG. 7, a storage means 35 for storing vials containing radioactive gas is shown as comprising a tubular member 36 made of a radioactive shielding material, such as lead, which member has a closed end covered by an energy shielding cap 37 and an open end 38 over which is fitted a removable cap 39 having a lead insert shield 40 and a resilient inner cushion member 41 attached thereto.

Figure 10:
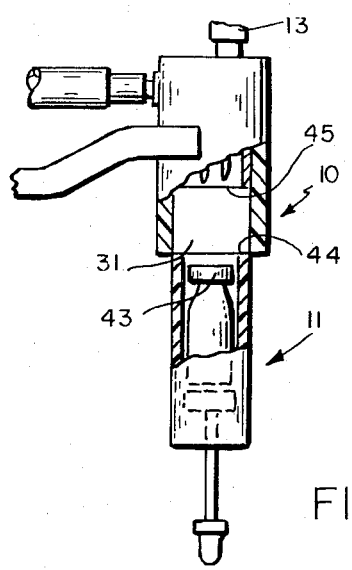
FIG. 10 shows a side view partially cut away and partially in cross-section of the gas dispensing device of FIG. 1 as the vial holder is initially inserted into the dispenser portion thereof.
Figure 10A:
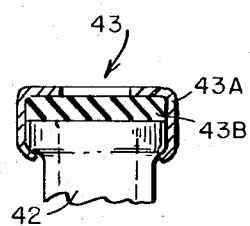
FIG. 10A shows an enlarged view of the cap of the vial shown in FIG. 10.

A plurality of sealed vials 42, each containing a pre-measured dose of a radioactive gas, are inserted lengthwise into tubular member 36, each of such vials having a sealing cap 43 comprising an outer metallic portion 43A having a substantially centrally located opening and a pierceable elastomeric septum 43B sealably pressed against the open mouth of the vial and a portion of which is exposed through said opening as shown in FIG. 10A, for example.

The septum is made of a material which is selected to have low absorption characteristics relative to the gas contained within the vial. That is, the material is selected to absorb as little as possible of the gas so as to minimize the amount of gas which is so absorbed and which ultimately permeates through the septum, subsequently to become lost to the atmosphere. Moreover, such material is further selected to provide for as low a capillary leakage of gas as possible from the vial at the interface between the septum and the vial body. Materials which have been successfully used for this purpose are butyl elastomer materials and fluorinated hydrocarbon materials, such as vinylidine fluoride elastomers, coated with Teflon at least over the bottom surface of the septum. The use of such materials permits the storage in the vial of a predetermined dosage of a gas with a minimization of the loss therefrom over a reasonably long period of time.

For example, in order to provide a pre-measured dosage of a radioactive Xenon gas, such as $^{133}$Xe which has a relatively short half life, the above materials have been found to hold the loss thereof to acceptable limits over the useful life thereof. Thus, for most practical applications it is found that a total loss of less than 10 percent of useable $^{133}$Xe over a two week period is acceptable. Teflon coated butyl elastomers or vinylidine fluoride materials available to the art can be empirically selected, for example, to provide losses which can be maintained well within such a loss criterion. One particular butyl elastomer material which has been found satisfactory is a Teflon coated butyl elastomer made and sold under the designation Butyl 860 by West Company, Phoenixville, Pa. One particular vinylidine fluoride material which is acceptable is made and sold under the designation VITON 459 by West Company, Phoenixville, Pennsylvania. In some cases the leakage loss may be further reduced to some extent by the use of a vacuum grade grease positioned between the septum and the lip of the vial. Such greases include silicone greases or high molecular weight hydrocarbon greases available to the art.

For gases other than Xenon, other loss criteria for providing acceptable storage characteristics can be devised and, accordingly, appropriate materials can be selected to meet such loss requirements from a knowledge of the absorption and leakage loss characteristics thereof relative to the gas in question, which loss characteristics can be obtained from the literature or can be determined empirically.

The vials are placed within storage device 36 in an end-to-end relation with the caps pointing toward the closed end 37 thereof and the bottoms of the vials pointing toward the open end 38 thereof. During use, the storage device is held in a generally vertical position as shown after the cap 39 has been removed, the open end of vial holder 11 being placed over the open end of tube 36 so that the openings of each are effectively contiguously aligned.

Figure 11:
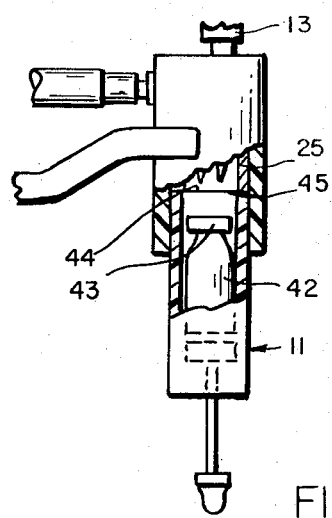
FIG. 11 shows a view similar to the view of FIG. 10 wherein the vial holder is partially inserted into the dispenser portion thereof.
Figure 12:
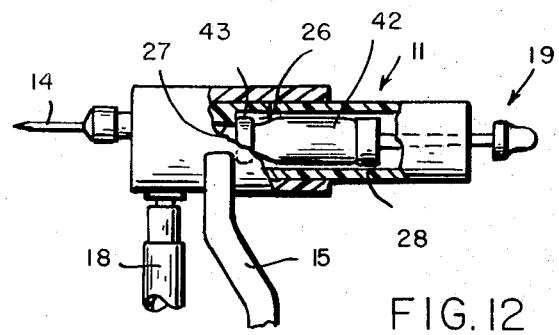
FIG. 12 shows still another view similar to that of FIG. 10 wherein the vial has moved to a position where its septum has been pierced.

The combination of tube 36 and vial holder 11 can then be partially inverted so as to point generally in a downward direction so that the topmost vial 42A within storage member 35 is permitted to slide to a position within vial holder 11 where its bottom rests against the disc-shaped head of plunger 19, as shown in FIG. 8. Vial holder 11 is then removed from its contiguous relationship with storage member 35 and cap 39 is replaced on the open end of the storage member, as shown in FIG. 9. Vial 42A is thereby retained within vial holder 11 with plunger means 19 in its fully outwardly extended position as shown in FIG. 9. FIGS. 10 through 12 describe the use of the gas dispensing device following the loading of the vial holder 11 with an appropriate vial of radioactive gas.

As seen in FIG. 10, vial holder 11 is brought to a location adjacent dispenser 10 so that it is in a position to be inserted, as by sliding, through the opening 31 of dispenser 10. Vial holder 11 is thereupon inserted into the interior of dispenser 10 until the end 44 of holder 11 effectively comes to rest against the end 45 of plastic insert 25, as best seen in FIG. 11. The device may be maintained in such condition for a relatively short time without harm since little radioactive energy can escape from the vial holder because of leaded liner 30 and leaded head 28 of plunger 19.

When the device is ready to be used for dispensing a premeasured dosage of radioactive gas through a hypodermic needle, for example, plunger means 19 is pushed forward in vial holder 11, as shown in FIG. 12, so that its inner head 28 pushes against the bottom of vial 42 and slides vial 42 through vial holder 11 to a position where its septum end is inserted into recess 26 into contact with the sharp ends of needles 23 and 24. The capped end of the vial is guided in its travel from its position in FIGS. 10 and 11 to its position in FIG. 12 by the recess 26, so as to assure that the needles pierce the septum and do not strike the metallic portion of the cap 43. Guiding means other than recess 26 may be used as, for example, an appropriately formed channel in vial holder 11 along which the vial slides during its movement towards needles 23 and 24.

During the forward movement of vial 42, the needles pierce the septum of cap 43 and extend into the interior of vial 42, cap 43 thereby coming to rest, in the particular embodiment described, on the shoulder of lower recess 27, as shown in FIG. 12.

In order to avoid the problem of "coring" during the piercing operation, wherein a portion of the septum may be removed, or cored, so as to become lodged in the needle itself to prevent the passage of fluid therethrough, the needles can be selected so that the piercing ends thereof are so shaped as to minimize the chances for coring to occur.

With the needle ends inserted into the interior of vial 42, flexible bulb 18 can be appropriately squeezed, as by hand, against rigid handle 15 so that sufficient air is pumped through needle 24 into vial 42 so as to force radioactive gas outwardly therefrom through needle 23 to hypodermic needle 14 via gas dispensing adapter 13. Sufficient air is contained in flexible bulb 18 to permit all of the radioactive gas contained in vial 42 to be forced outwardly therefrom through hypodermic needle 14 so that an accurate measured dosage of such radioactive gas is thereby available for use. When the gas has been appropriately evacuated from the vial, the hypodermic needle can be removed from the dispenser adapter and appropriately disposed. The vial holder 11 can be removed from dispenser 10 and the empty vial therein can be removed by hand. The previously used vial will not contain sufficient residual radioactive gas to be harmful and can be appropriately discarded. The vial holder 11 may be inserted into dispenser 10 when not in use for easy storage.

Variations in the specific structure described above may be used for particular applications. For example, the insert 25 in which the fluid intake adapter, the gas dispensing adapter and the needles are embedded may be arranged to be removable from the dispenser 10 so that should any such elements be damaged a new insert containing such elements can be substituted therefor without the necessity for discarding the entire dispenser assembly.

Further, other fluids other than air may be used to displace the gas from the vial, depending on the application for which the invention is used. Moreover, such fluids, including air, may be injected by means other than through the use of a collapsible bulb as shown above and the amount of such fluid which is injected may be accurately controlled, if desired, by using means which provide a measurable and controlled volume of such fluid during the injection process.

While the dispensing device as shown above is used in a portable manner, the dispenser portion thereof may be fixedly mounted for use in a permanent, or semi-permanent environment. The size of the device may be varied depending on the size of the vials used to contain the pre-measured dosages of gas involved.

Thus, the gas dispensing device and storage means described above, as well as the method of use thereof described in connection therewith, provides a safe and relatively easy-to-use system for obtaining a pre-measured dose of a gas such as a radioactive gas.

The aforesaid description and examples are given by way of example and it is not intended that the invention be limited thereto or to any theory advanced but only to the products and methods described in the following claims and their equivalents.

What is claimed is:

1. A device for dispensing a pre-measured amount of a stored radioactive gas contained in a sealed vial having a pierceable septum, said device comprising
    dispenser means having a gas dispensing adapter for dispensing said gas from said device and a displacement gas intake adapter;
    first needle means mounted in said dispenser means and connected to said displacement gas intake adapter;
    second needle means mounted in said dispenser means and connected to said gas dispensing adapter;
    displacement gas injection means, including a source of displacement gas, connected to said displacement gas intake adapter;
    gas dispensing means connected to said gas dispensing adapter
    means for holding said sealed vial, said vial holding means being adapted to be releasably connected to said dispenser means so that the pierceable septum of said vial is positioned therein opposite said first and second needle means;

means for relatively moving said vial and said first and second needle means within said dispenser means so that said vial comes into contact with said first and second needle means to pierce said septum, said first and second needle means thereupon extending into the gas filled interior of said vial to provide communication between the interior of said vial and said gas dispensing adapter through said second needle means and between the interior of said vial and said source of displacement gas through said first needle means;

whereby, displacement gas may be injected into said vial from said displacement gas injection means and upon injection of said displacement gas, a premeasured amount of said stored radioactive gas is dispensed from the vial and device through said gas dispensing adapter and said gas dispensing means one way valve means for preventing substantial flow of said premeasured amount of radioactive gas from said vial to said source of displacement gas but permitting flow of said displacement gas to said vial from said displacement gas source.

2. A device in accordance with claim 1 wherein said displacement fluid is air.

3. A device for dispensing a pre-measured amount of gas contained in a sealed vial having a pierceable septum, said device comprising dispenser means having a gas dispensing adapter and a displacement fluid intake adapter;

piercing means mounted in said dispenser means;

displacement fluid injection means connected to said fluid adapter;

means for holding said sealed vial, said vial holding means being adapted to be releasably connected to said dispenser means so that the pierceable septum of said vial is positioned therein opposite said piercing means;

means for relatively moving said vial and said piercing means within said dispenser means so that said vial comes into contact with said piercing means to pierce said septum, said piercing means thereupon extending into the gas filled interior of said vial whereby, upon injection of said displacement fluid, a pre-measured amount of said gas is dispensed at said gas dispensing adapter said displacement fluid being air, said displacement fluid injection means being a collapsible air containing means comprising a flexible bulb and said dispenser means further including rigid means adjacent said flexible bulb, whereby said bulb may be collapsed against the surface of said rigid means.

4. A device in accordance with claim 3 wherein said rigid means extends from said dispenser means and is shaped so as to provide a hand-gripping configuration whereby said flexible bulb can be collapsed by squeezing said flexible bulb against said rigid means.

5. A device in accordance with claim 1 wherein said gas is radioactive and said vial holding means includes means for shielding said vial to attenuate the escape of radioactive energy from said gas through said holding means.

6. A device in accordance with claim 5 wherein said shielding means comprises a lead liner enclosing at least a portion of said vial in said vial holding means.

7. A device in accordance with claim 1 wherein said moving means comprises a plunger having means at one end thereof for contacting said vial within said holder means and means at the other end thereof adapted to be moved externally of said vial holding means.

8. A device in accordance with claim 7 wherein said plunger is mounted in an insert at one end of said vial holding means.

9. A device in accordance with claim 7 wherein said gas is radioactive and said vial contacting means includes a shielding member substantially covering the end of said vial with which it comes into contact for attenuating the escape of radioactive energy from said gas at said end of said vial.

10. A device in accordance with claim 1 wherein said dispenser means includes an insert, said gas dispensing adapter, said displacement fluid intake adapter and said first and second needles means being mounted in said insert.

11. A device in accordance with claim 10 wherein said insert is removable from said dispenser means.

12. A device in accordance with claim 10 and further including means for guiding the movement of said vial within said dispenser means.

13. A device in accordance with claim 12 wherein said guiding means comprises a recess in said insert, said first and second needles extending into said recess and said recess having a configuration substantially conforming to the configuration of said vial whereby said vial moves within said recess and its septum moves toward and into contact with said first and second needles therein.

14. A method for loading and dispensing a premeasured amount of radioactive gas contained in a sealed vial having a pierceable septum comprising the steps of removing said vial from a radioactive shielded storage tube in which a plurality of said vials are stored in end-to-end relation so that said pierceable septum is held in an exposed position;

inserting said removed vial into a gas dispensing device;

said removing and inserting steps comprising holding an open end of said tube over and in alignment with an open end of a vial holding device forming part of said gas dispensing device and sliding said vial adjacent said open end of said tube from said tube into said vial holding device piercing said exposed septum at two locations when said vial has been inserted in said vial holding device feeding from a source thereof a displacement gas into said vial through one of said pierced locations to force said radioactive gas out from said vial through the other of said locations to a dispensing means of said gas dispensing device and from said dispensing means out of said dispensing device without permitting substantial escape of said radioactive gas from said vial to said source.

15. A method for loading and dispensing a premeasured amount of a radioactive gas contained in a sealed vial having a pierceable septum comprising the steps of removing said vial from an elongated radioactive shielded storage tube containing a plurality of said vials in end-to-end relation so that siad pierceable septum is held in an exposed position;

inserting said removed vial into a gas dispensing device;

piercing said exposed septum at two locations when said vial has been inserted in said gas dispensing device;

feeding a displacement fluid into said vial through one of said pierced locations to force said gas out from said vial through the other of said locations to a dispensing means of said dispensing device;

said tube having an opening at one end with a removable cover, said removing and inserting steps including removing said cover from said storage tube to expose said opening;

holding said opening of said storage tube so that it is contiguously aligned with the opening of a radioactive shielded vial holder of said gas dispensing device and sliding said vial adjacent said open end of said tube from the storage tube into said vial holder;

inserting said vial holder loaded with said vial into the open end of a radioactive shielded chamber of a dispenser portion of said gas dispensing device;

and slidably forcing said vial in said holder to a position in which said septum is pierced at said two locations by two pierceable needles mounted on said dispenser portion and extending into the other end of said chamber, whereby said vial is loaded into said gas dispensing device and the radioactive gas therein is dispensed with a minimal exposure to radioactive energy from said radioactive gas.

16. A method in accordance with claim 15 wherein said displacement fluid is air and said feeding step includes collapsing an air containing means to provide a supply of said air; and feeding said air to said vial through an intake means of said gas dispensing device.

* * * * *